United States Patent
Guo et al.

(10) Patent No.: US 9,465,156 B2
(45) Date of Patent: Oct. 11, 2016

(54) BACKLIGHT MODULE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Junjie Guo, Beijing (CN); Yutao Hao, Beijing (CN); Bin Zou, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 24 days.

(21) Appl. No.: 14/100,681

(22) Filed: Dec. 9, 2013

(65) Prior Publication Data
US 2014/0160791 A1 Jun. 12, 2014

(30) Foreign Application Priority Data
Dec. 12, 2012 (CN) .......................... 2012 1 0537487

(51) Int. Cl.
*F21V 7/04* (2006.01)
*F21V 8/00* (2006.01)

(52) U.S. Cl.
CPC ........... *G02B 6/0031* (2013.01); *G02B 6/0068* (2013.01); *G02B 6/0073* (2013.01); *G02B 6/0085* (2013.01)

(58) Field of Classification Search
CPC . G02B 6/0031; G02B 6/0013; G02B 6/0028
USPC ........................................................ 362/613
See application file for complete search history.

(56) References Cited

U.S. PATENT DOCUMENTS 7,193,248 B2 * 3/2007 Weindorf et al. ............. 257/100
7,674,029 B2 * 3/2010 Liu et al. ...................... 362/609
(Continued)

FOREIGN PATENT DOCUMENTS

CN        1922436 A       2/2007
CN      101852363 A      10/2010
(Continued)

OTHER PUBLICATIONS

European Search Report dated Apr. 1, 2014 in reference to application No. 13196384.5-1553.
(Continued)

*Primary Examiner* — Anh Mai
*Assistant Examiner* — Matthew Peerce
(74) *Attorney, Agent, or Firm* — Nath, Goldberg & Meyer; Jerald L. Meyer; Stanley N. Protigal (57) ABSTRACT

A backlight module and a display device comprise: a light guide plate; a LED light bar including a plurality of LED lamps arranged at intervals at a side of the light guide plate so as to emit the light to the light-entering surface of the light guide plate, and a gap provided between the LED light bar and the light guide plate; and a reflection member arranged outside the gap and reflecting the light from the LED light bar toward the light guide plate, wherein first regions and second regions are arranged on the reflection member at intervals, the first regions correspond to positions of the LED lamp, the second regions correspond to an interval between the plurality of LED lamps and/or a position outside the LED lamps at the end of the LED light bar, and the first region has a reflective index less than the second region.

18 Claims, 3 Drawing Sheets

(56) References Cited

U.S. PATENT DOCUMENTS

| | | | |
|---|---|---|---|
| 8,092,042 B2* | 1/2012 | Wilcox | 362/249.02 |
| 8,602,603 B2* | 12/2013 | Fang et al. | 362/311.01 |
| 2007/0165419 A1 | 7/2007 | Horiuchi et al. | |
| 2008/0074580 A1* | 3/2008 | Chang | 349/65 |
| 2009/0073724 A1* | 3/2009 | Hayama et al. | 362/620 |
| 2009/0296423 A1* | 12/2009 | Kim et al. | 362/623 |
| 2010/0165660 A1* | 7/2010 | Weber et al. | 362/609 |
| 2010/0265696 A1 | 10/2010 | Ho | |
| 2011/0242845 A1* | 10/2011 | Hong et al. | 362/608 |
| 2012/0069597 A1* | 3/2012 | Sone et al. | 362/609 |
| 2012/0081925 A1* | 4/2012 | Cho et al. | 362/613 |
| 2012/0230056 A1* | 9/2012 | Hanaoka et al. | 362/612 |
| 2012/0275192 A1* | 11/2012 | Wakamura et al. | 362/613 |
| 2012/0281148 A1* | 11/2012 | Yoshikawa | 348/725 |
| 2013/0027633 A1* | 1/2013 | Park et al. | 349/62 |
| 2013/0128189 A1* | 5/2013 | Hu et al. | 349/65 |
| 2013/0163286 A1* | 6/2013 | Lai | 362/613 |
| 2014/0146563 A1* | 5/2014 | Watanabe et al. | 362/606 |
| 2014/0340586 A1* | 11/2014 | Terashima | 348/790 |

FOREIGN PATENT DOCUMENTS

| | | | |
|---|---|---|---|
| CN | 101852945 A | | 10/2010 |
| CN | 202091949 U | | 12/2011 |
| CN | 102767762 A | | 11/2012 |
| JP | 2003242817 A | | 8/2003 |
| JP | WO 2012066887 | * | 5/2012 |
| WO | 2012066887 A1 | | 5/2012 |
| WO | 2012165248 A1 | | 6/2012 |
| WO | 2012132568 A1 | | 10/2012 |

OTHER PUBLICATIONS

Chinese Patent Application No. 201210537487.8, Office Action dated Jul. 3, 2014, seven (7) pages, English translation three (3) pages.

Chinese Patent Application No. 201210537487.8, Office Action dated Feb. 12, 2015, six (6) pages, English translation four (4) pages.

* cited by examiner

BACKLIGHT MODULE AND DISPLAY DEVICE

CROSS REFERENCE

The present application claims a priority of the Chinese patent application No. 201210537487.8 entitled "backlight module and display device", which is incorporated herein by reference in its entirety.

BACKGROUND OF THE INVENTION

1. Field of the Invention

The present invention relates to a field of liquid crystal display technology, in particular to a backlight module and a display device.

2. Description of the Prior Art

Currently, liquid crystal display (LCD) is a commonly used flat panel display, and it includes a backlight module as an important part for serving as a light source for a liquid crystal panel during the operation of the LCD. According to different incident positions of the light, the backlight module includes side-type backlight module and direct-type backlight module. For the direct-type backlight module, a light source such as a CCFL (Cold Cathode Fluorescent Lamp) or LED (Light Emitting Diode) is positioned behind the liquid crystal panel, so as to directly provide the area light to the liquid crystal panel. For the side-type backlight module, a LED light bar is positioned at an edge of a back plate of the liquid crystal panel. The light from the LED light bar enters a light guide plate (LGP) from a light-entering surface at a side of the LGP, emerges out from a light-exiting surface of the LGP upon reflection and diffusion, and then passes through optical films to form the area light to be provided to the liquid crystal panel.

Figure 1:
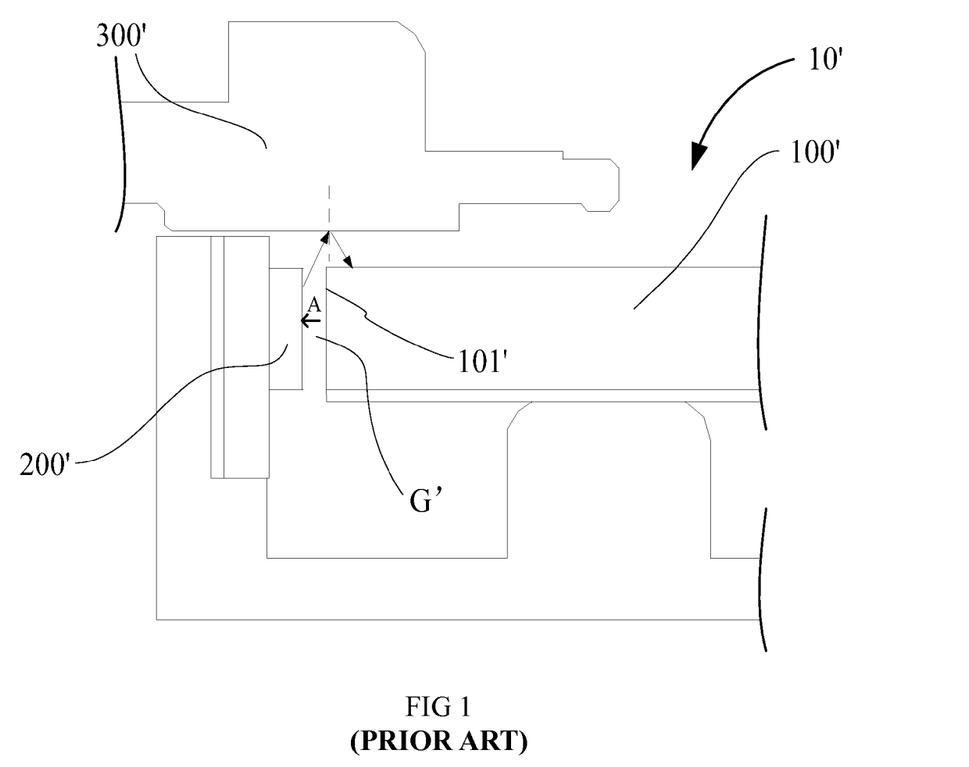
FIG. 1 is a side schematic view of a traditional backlight module.
Figure 2:
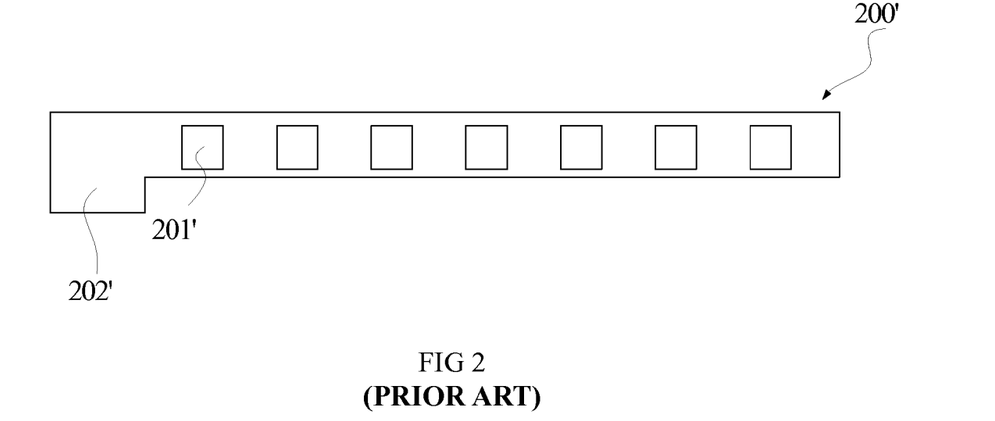
FIG. 2 is an enlarged schematic view of a LED light bar of the traditional backlight module in FIG. 1 viewed along an arrow A.

The traditional side-type backlight module comprises a outer frame, a rubber frame, a back plate, a LED light bar and a light guide plate, and so on. FIG. 1 is a side view of the traditional backlight module. As shown in FIG. 1, the light guide plate 100' of the side-type backlight module 10' is positioned at a side of the liquid crystal panel that receives the incident light. The LED light bar 200' is positioned at a edge of the light guide plate 100', i.e., facing a light-entering surface 101' of the light guide plate 100'. There is a gap G' between the LED light bar 200' and the light guide plate 100'. In teams of thermology, the larger the gap G', the better. In terms of optics, if the gap G' is too large, a part of the light from the LED light bar 200' will reach the rubber frame 300' arranged at an upper side of the LED light bar 200' and the light guide plate 100', rather than enter the light-entering surface 101' of the light guide plate 100'. As a result, the utilization rate of the light from the LED light bar 200' will be low, and a brightness loss will be caused. FIG. 2 is an enlarged view of the LED light bar 200' in the traditional backlight module 10' in FIG. 1 viewed along an arrow A. As shown in FIG. 2, usually the LED light bar 200' includes a PCB plate 202' and a plurality of LED lamps 201' arranged at intervals. Hence, the light intensity is high at the place where the LED lamps 201 are located, while the light intensity is low at intervals between the adjacent LED lamps. As a result, an uneven light intensity will be achieved and hot spots will easily be caused.

Figure 3:
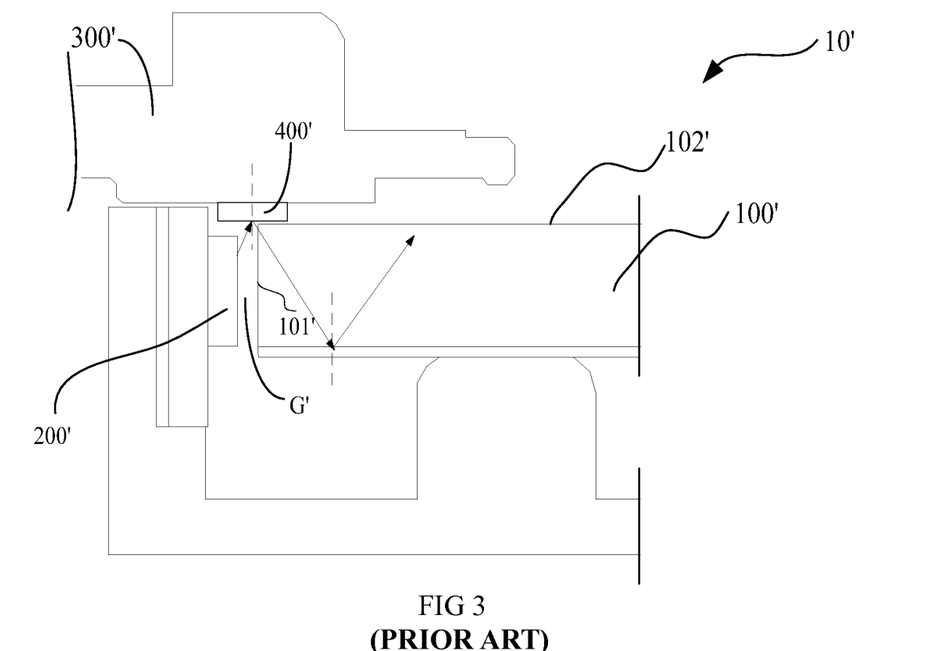
FIG. 3 is a side schematic view of another backlight module in the prior art.

FIG. 3 is a side view of another backlight module in the prior art. As shown in FIG. 3, a reflector 400' parallel to a light-exiting surface 102' of the light guide plate 100' is arranged at an upper side of a gap between the LED light bar 200' and the light guide plate 100', so as to reflect the light from the LED light bar 200' to the light-entering surface 101' of the light guide plate 100', thereby to meet the requirement of a large gap G' between the LED light bar 200' and the light guide plate 100' in terms of thermology, and to reduce the light loss. However, such a structure, on one hand, cannot solve the problem of uneven light intensity due to the distribution of the LED lamps at intervals as well as the hot spots generated thereby, and on the other hand, cannot solve the problem of light loss due to the escape of a part of the light from the slit between the reflector 400' and the light guide plate 100'.

SUMMARY OF THE INVENTION

An object of the present invention is to provide a backlight module, so as to increase the brightness of a light guide plate, prevent a brightness loss of the light from a LED light source, and improve the utilization rate of the LED light source.

In one aspect, the technical solution (1) according to the present invention provides a backlight module comprises a light guide plate including a light-entering surface, a light-exiting surface adjacent to the light-entering surface, and a back surface opposite to the light-exiting surface; a LED light bar including a plurality of LED lamps arranged at intervals. The LED light bar is arranged at a side of the light guide plate so as to emit the light to the light-entering surface of the light guide plate, and a gap is provided between the LED light bar and the light guide plate; and a reflection member is arranged outside the gap. A reflection surface of the reflection member faces the gap so as to reflect the light from the LED light bar toward the light-entering surface of the light guide plate. First regions and second regions are arranged on the reflection surface of the reflection member at intervals, and a position of each first region corresponds to a position of each LED lamp, and a position of each second region corresponds to a position between two adjacent LED lamps or a position outside of the LED lamps on the end of the LED light bar, and the first region has a reflective index less than the second region.

In a preferable backlight module, the reflection member includes a first reflector arranged at a side of the light-exiting surface of the light guide plate, and an end of the first reflector adjacent to the light guide plate is inclined toward the light-exiting surface of the light guide plate, and there is a first inclination angle between a reflection surface of the first reflector and the light-exiting surface of the light guide plate.

In a further preferable backlight module, the first inclination angle is about 8° to 28°.

In a further preferable backlight module, further comprises a rubber frame, at least a part of which is arranged at a side of the light-exiting surface of the light guide plate and covers the gap, and the first reflector is fixed to a position where the rubber frame covers the gap.

In a further preferable backlight module, a sealing sheet is provided at a slit between the end of the first reflector adjacent to the light guide plate and the light-exiting surface of the light guide plate, so as to prevent the light from the LED light bar from passing through the slit between the first reflector and the light guide plate.

In a further preferable backlight module, the reflection member further includes a second reflector arranged opposite to the first reflector, an end of the second reflector adjacent to the light guide plate is inclined toward the back surface of the light guide plate, and there is a second inclination angle between a reflection surface of the second reflector and the back surface of the light guide plate.

In a further preferable backlight module, the second inclination angle is about 8° to 28°.

In a further preferable backlight module, a bottom reflection sheet is arranged at a side of the back surface of the light guide plate, and the second reflector is fixed to an end of the bottom reflection sheet adjacent to the LED Light bar, or is integrally formed with the bottom reflection sheet.

In a further preferable backlight module, each first region is formed by an adhesive belt provided between the second regions of the reflection member or by a coating coated between the second regions of the reflection member.

In a further preferable backlight module, the color of the adhesive belt or the coating is black.

In a further preferable backlight module, a distance between luminescent centers of the adjacent LED lamps in the LED Light bar is about 6.9 to 9 mm and the width of each first region is about 2 to 3 mm.

In a further preferable backlight module, the reflection member comprises a main body formed by a black body, and reflection sheets arranged at intervals on the main body at the positions corresponding to the second regions, and the regions without the reflection sheets are the first regions.

In another aspect, the present invention provides a display device comprising the above-mentioned backlight module.

The present invention has the following advantageous effects. According to the backlight module of the present invention, the reflection member is arranged outside the gap between the LED light bar and the light guide plate, so as to meet the requirement of a large gap between the LED Light bar and the light guide plate in terms of thermology, and to improve the utilization rate of the light source. In addition, a position of each first region corresponds to a position of each LED lamp, and a position of each second region corresponds to a position between two adjacent LED lamps or a position outside of the LED lamps on the end of the LED light bar, and the first region has a reflective index less than the second region, so as to reflect the light at the intervals between the LED lamps and/or outside the LED lamps at the end of the LED light bar to the light guide plate as much as possible, thereby to achieve even light intensity and reduce hot spots.

DETAILED DESCRIPTION OF THE PREFERRED EMBODIMENTS

To make the objects, the technical solutions and the advantages of the present invention more apparent, the present invention will be described hereinafter in conjunction with the drawings and the embodiments.

Figure 4:
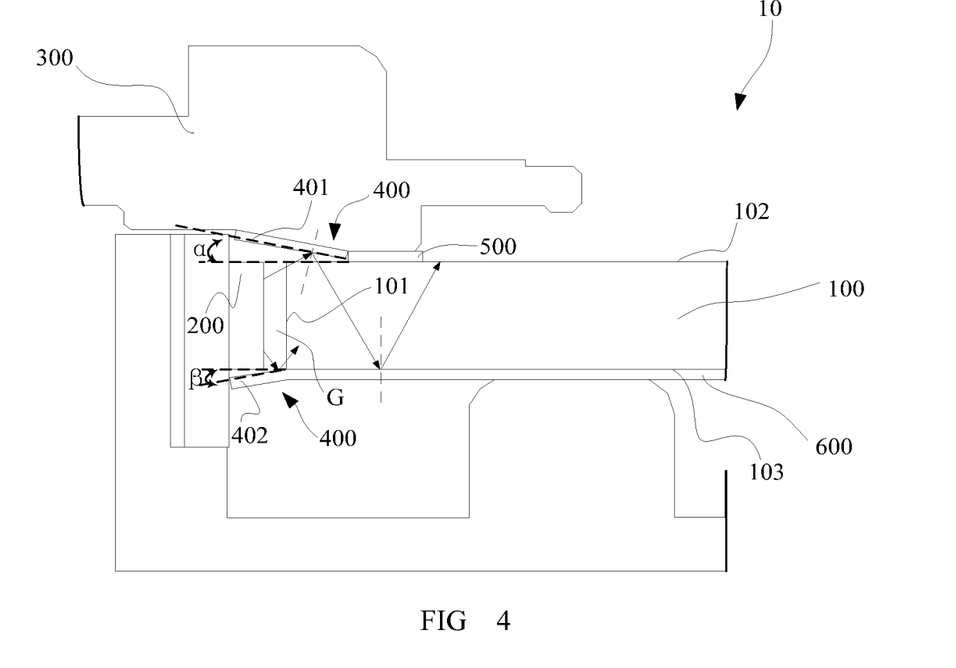
FIG. 4 is a side schematic view of a backlight module according to one embodiment of the present invention.

FIG. 4 is a side schematic view of a backlight module according to one embodiment of the present invention. As shown in FIG. 4, the backlight module comprises a light guide plate 100 including a light-entering surface 101, a light-exiting surface 102 adjacent to the light-entering surface 101, and a back surface 103 opposite to the light-exiting surface 102.

Figure 5:
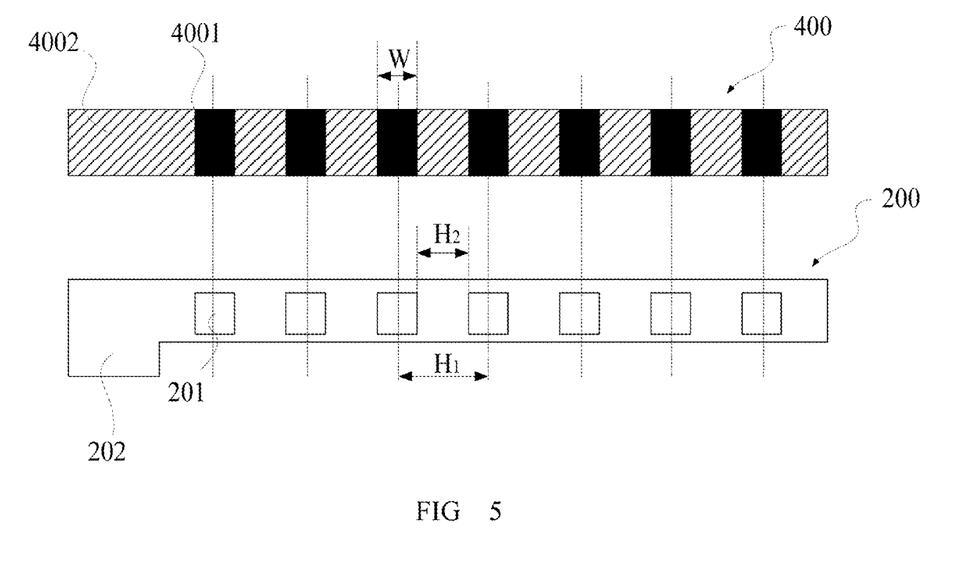
FIG. 5 is a schematic view showing the positional relationship between a reflection member and the LED light bar in the backlight module according to one embodiment of the present invention.

FIG. 5 is a schematic view showing the positional relationship between a reflection member and a LED light bar in the backlight module according to one embodiment of the present invention. As shown in FIG. 5, the LED light bar 200 includes a PCB 202 and a plurality of LED lamps 201 arranged at intervals. The LED light bar 200 is arranged at a side opposite to the light-entering surface 101 of the light guide plate 100, and there is a gap G between the LED light bar 200 and the light guide plate 100, so as to emit the light to the light-entering surface 101 of the light guide plate 100.

In one embodiment of the present invention, the reflection member 400 arranged outside the gap G (i.e., at upper and lower sides thereof as shown in FIG. 4) has a reflection surface facing the gap, so as to reflect the light from the LED light bar 200 toward the light-entering surface 101 of the light guide plate 100.

As shown in FIG. 5, first regions 4001 and second regions 4002 are arranged on the reflection surface of the reflection member 400 at intervals. A position of the first region 4001 corresponds to a position of the LED lamp 201, and a position of the second region 4002 corresponds to a position of a interval between the LED lamps 201 and/or a position outside the LED lamps 201 at the end of the LED light bar 200. The first region 4001 has a reflective index less than the second region 4002, so that the light at the intervals between the LED lamps and/or outside the LED lamps 201 at the end of the LED light bar 200, as compared with the light at the LED lamps, is reflected more to the light-entering surface of the light guide plate. As a result, it is able to appropriately reduce the difference between the intensity of the incident light at the intervals between the LED lamps, at the position outside the LED lamps 201 at the end of the LED light bar 200 and the intensity of the incident light at the LED lamps, thereby to achieve even light intensity and reduce hot spots.

According to the backlight module of the present invention, the reflection member 400 is arranged at the gap between the LED light bar 200 and the light guide plate 100, so as to meet the requirement of a large gap between the LED light bar 200 and the light guide plate 100 in terms of thermology, and to improve the utilization rate of the light source. In addition, the first regions 4001 corresponding to the positions of the LED lamps 201 and the second regions 4002 corresponding to the positions of the intervals between the LED lamps 201 and/or a position outside the LED lamps 201 at the end of the LED light bar 200 and having a reflective index greater than the first regions 4001 are arranged on the reflection surface of the reflection member 400, so as to reflect the light at the intervals between the LED lamps 201 and/or outside the LED lamps 201 at the end of the LED light bar 200 to the light guide plate 100 as much as possible, thereby to achieve even light intensity and reduce hot spots.

Preferably, the reflection member 400 may be arranged at an upper side of the gap G, i.e., at a side of the light-exiting surface 102 of the light guide plate 100, and cover the gap G. Also, the reflection member 400 may be arranged at a lower side of the gap G, i.e., at a side of the back surface 103 of the light guide plate 100, and cover the gap G. Further, the reflection member 400 may be arranged at the side of the light-exiting surface 102 of the light guide plate 100 and the side of the back surface 103 of the light guide plate 100 respectively, and cover the gap, as shown in FIG. 4. The reflection member 400 may be arranged horizontally or obliquely.

In a preferred embodiment, as shown in FIG. 4, the reflection member 400 that covers the gap G preferably comprises a first reflector 401 arranged at a side of the light-exiting surface 102 of the light guide plate 100 and a second reflector 402 arranged at a side of the back surface 103 of the light guide plate 100. A reflection surface of the first reflector 401 is opposite to a reflection surface of the second reflector 402. An end of the first reflector 401 adjacent to the light guide plate 100 is inclined toward the light-exiting surface 102 of the light guide plate 100, so that there is a first inclination angle α between the reflection surface of the first reflector 401 and the light-exiting surface 102 of the light guide plate 100.

An end of the second reflector 402 adjacent to the light guide plate 100 is inclined toward the back surface 103 of the light guide plate 100, so that there is a second inclination angle β between the reflection surface of the second reflector 402 and the back surface 103 of the light guide plate 100. In other words, the first reflector 401 and the second reflector 402 form a reflection cover between the LED light bar 200 and the light guide plate 100 so as to surround the light source, and the reflection cover converges to an end adjacent to the light guide plate 100 from an end adjacent to the LED light bar 200. As a result, it is able to maximally reflect the light from the LED light bar 200 to the light-entering surface 101 of the light guide plate 100, and to improve the light incidence rate.

The first inclination angle α is preferably 8° to 28°, and more preferably, 10° to 20°, so as to reflect the light to the light-entering surface 101 of the light guide plate 100 as much as possible.

The second inclination angle β is preferably 8° to 28°, and more preferably, 10° to 20°, so as to reflect the light to the light-entering surface 101 of the light guide plate 100 as much as possible.

In a further preferred embodiment, the first reflector 401 and the second reflector 402 are preferably fixed by the following ways.

As shown in FIG. 4, the backlight module 10 further comprises a rubber frame 300, at least a portion of which is arranged above the light-exiting surface 102 of the light guide plate 100 and covers the upper side of the gap G The first reflector 401 is preferably fixed to the portion of the rubber frame 300 that covers the gap G.

Further preferably, a bottom reflector 600 is arranged at the back surface 103 of the guide light plate 100, and the second reflector 402 is fixed to an end of the bottom reflector 600 adjacent to the LEI) light bar 200. The second reflector 402 may also be integrally formed with the bottom reflector 600.

It is to be noted that, the fixation of the first reflector 401 and the second reflector 402 is not limited to the above-mentioned ways.

More preferably, a face of the outer frame 300 to which the first reflector 401 is fixed is an oblique surface, so that the obliquely arranged first reflector 401 can be fixed thereto.

More preferably, a sealing sheet 500 is provided at a slit between the end of the first reflector 401 adjacent to the light guide plate 100 and the light-exiting surface 102 of the light guide plate 100, so as to prevent a bright line formed when the light from the LED light bar 200 passes through the slit between the first reflector 401 and the light-exiting surface 102 of the light guide plate 100.

In a further preferred embodiment, it is to be noted that, the first region 4001 may be formed by an adhesive belt provided between the second regions 4002 of the reflection member 400 (i.e. the first reflector 401 and/or the second reflector 402) or by a coating coated between the second regions 4002 of the reflection member 400. It should be appreciated that, in practical application, the first region 4001 may be formed by the other ways, which are not listed herein.

Preferably, the first region 4001 is formed by a black adhesive belt provided between the second regions 4002 of the reflection member 400 or by a black coating coated between the second regions 4002 of the reflection member 400, so as to form a non-reflective region with a black surface. Such a non-reflective region has an excellent light absorption property, and can reflect the light from the LED lamps 201 as little as possible. As a result, it is able to achieve even light intensity.

In a further preferred embodiment, the first reflector 401 and the second reflector 402 may have a main body formed by a black body, such as a black adhesive belt or black coating, with small reflectors arranged at intervals on the main body at the positions corresponding to the positions of the intervals between the LED lamps 201. Each small reflector is just a second region 4002, and the regions without the small reflectors are just the first regions 4001 arranged at intervals.

In addition, the main body formed by the black adhesive belt preferably has a thickness of 0.1 to 0.2 mm, and the black adhesive belt may be made of Mylar or silicon-rubber.

A width of the black adhesive belt may be preferably selected according to the type of the LED lamp 201. For example, when the LED lamp 201 is of a type 5630, the black adhesive belt may have a width of 1 to 4 mm, preferably 2 to 3 mm.

In addition, the widths of the second region 4002 and the first region 4001 on the first reflector 401 and the second reflector 402 may be adjusted according to the positions and sizes of the LED lamps 201 in the LED light bar 200, so as to achieve an optimal effect.

For example, in a further preferred embodiment, if a distance $H_1$ between luminescent centers of the adjacent LED lamps 201 in the LED Light bar 200 is 6.9 to 9 mm and a distance $H_2$ between the adjacent LED lamps 201 is 1 to 3.4 mm, the width W of the first region 4001 will be 2 to 3 mm.

The above are merely the preferred embodiments of the present invention. It should be noted that, a person skilled in the art may further make improvements and modifications without departing from the principle of the present invention, and these improvements and modifications shall also be considered as the scope of the present invention.

What is claimed is:
1. A backlight module, comprising:
a light guide plate including a light-entering surface, a light-exiting surface adjacent to the light-entering surface, and a back surface opposite to the light-exiting surface;
a LED light bar including a plurality of LED lamps arranged at intervals, the LED light bar being arranged at a side of the light guide plate so as to emit the light to the light-entering surface of the light guide plate, and a gap being provided between the LED light bar and the light guide plate; and a reflection member arranged outside the gap, a reflection surface of the reflection member facing the gap so as to reflect the light from the LED light bar toward the light-entering surface of the light guide plate, wherein, first regions and second regions are arranged on the reflection surface of the reflection member at intervals, a position of each first region corresponds to a position of each LED lamp, a position of each second region corresponds to a position between two adjacent LED lamps or a position outside of the LED lamps on the end of the LED light bar, and the first region has a reflectivity index less than the second region, and wherein the reflection member includes a first reflector arranged at a side of the light-exiting surface of the light guide plate, an end of the first reflector adjacent to the light guide plate is inclined toward the light-exiting surface of the light guide plate, there is a first inclination angle between a reflection surface of the first reflector and the light-exiting surface of the light guide plate, and the first regions and the second regions are arranged on a reflection surface of the first reflector.

2. The backlight module according to claim 1, wherein the first inclination angle is about 8° to 28°.

3. The backlight module according to claim 1, wherein the backlight module further comprises a rubber frame, at least a part of which is arranged at a side of the light-exiting surface of the light guide plate and covers the gap, and the first reflector is fixed to a position where the rubber frame covers the gap.

4. The backlight module according to claim 3, wherein a sealing sheet is provided at a slit between the end of the first reflector adjacent to the light guide plate and the light-exiting surface of the light guide plate, so as to prevent the light from the LED light bar from passing through the slit between the first reflector and the light guide plate.

5. The backlight module according to claim 1, wherein the reflection member further includes a second reflector arranged opposite to the first reflector, an end of the second reflector adjacent to the light guide plate is inclined toward the back surface of the light guide plate, and there is a second inclination angle between a reflection surface of the second reflector and the back surface of the light guide plate.

6. The backlight module according to claim 5, wherein the second inclination angle is about 8° to 28°.

7. The backlight module according to claim 5, wherein a bottom reflection sheet is arranged at a side of the back surface of the light guide plate, and the second reflector is fixed to an end of the bottom reflection sheet adjacent to the LED light bar, or is integrally formed with the bottom reflection sheet.

8. The backlight module according to claim 1, wherein each first region is formed by an adhesive belt provided between the second regions of the reflection member or by a coating coated between the second regions of the reflection member.

9. The backlight module according to claim 8, wherein the color of the adhesive belt or the coating is black.

10. The backlight module according to claim 1, wherein a distance between luminescent centers of the adjacent LED lamps in the LED Light bar is about 6.9 to 9 mm and the width of each first region is about 2 to 3 mm.

11. The backlight module according to claim 1, wherein the reflection member comprises:

a main body, formed by a black body, reflection sheets, arranged at intervals on the main body at the positions corresponding to the second regions, and the regions without the reflection sheets are the first regions.

12. A display device comprising a backlight module, the backlight module, comprising:

a light guide plate including a light-entering surface, a light-exiting surface adjacent to the light-entering surface, and a back surface opposite to the light-exiting surface;

a LED light bar including a plurality of LED lamps arranged at intervals, the LED light bar being arranged at a side of the light guide plate so as to emit the light to the light-entering surface of the light guide plate, and a gap being provided between the LED light bar and the light guide plate; and a reflection member arranged outside the gap, a reflection surface of the reflection member facing the gap so as to reflect the light from the LED light bar toward the light-entering surface of the light guide plate, wherein first regions and second regions are arranged on the reflection surface of the reflection member at intervals, a position of each first region corresponds to a position of each LED lamp, a position of each second region corresponds to a position between two adjacent LED lamps or a position outside of the LED lamps on the end of the LED light bar, and the first region has a reflectivity index less than the second region, and wherein the reflection member includes a first reflector arranged at a side of the light-exiting surface of the light guide plate, an end of the first reflector adjacent to the light guide plate is inclined toward the light-exiting surface of the light guide plate, there is a first inclination angle between a reflection surface of the first reflector and the light-exiting surface of the light guide plate, the first inclination angle is about 8° to 28°, and the first regions and the second regions are arranged on a reflection surface of the first reflector.

13. The display device according to claim 12, wherein a sealing sheet is provided at a slit between the end of the first reflector adjacent to the light guide plate and the light-exiting surface of the light guide plate, so as to prevent the light from the LED light bar from passing through the slit between the first reflector and the light guide plate.

14. The display device according to claim 12, wherein the reflection member further includes a second reflector arranged opposite to the first reflector, an end of the second reflector adjacent to the light guide plate is inclined toward the back surface of the light guide plate, and there is a second inclination angle between a reflection surface of the second reflector and the back surface of the light guide plate, the second inclination angle is about 8° to 28°.

15. The display device according to claim 14, wherein a bottom reflection sheet is arranged at a side of the back surface of the light guide plate, and the second reflection sheet is fixed to an end of the bottom reflection sheet adjacent to the LED light bar.

16. The display device according to claim 12, wherein each first regions is formed by an adhesive belt provided between the second regions of the reflection member or by a coating coated between the second regions of the reflection member.

17. The display device according to claim 16, wherein the color of the adhesive belt or coating is black.

18. The display device according to claim 12, wherein the reflection member comprises:

a main body formed by a black body, reflection sheets arranged at intervals on the main body at the positions corresponding to the second regions, and the regions without the reflection sheets are the first regions.

* * * * *

UNITED STATES PATENT AND TRADEMARK OFFICE
CERTIFICATE OF CORRECTION

PATENT NO.         : 9,465,156 B2                                        Page 1 of 1
APPLICATION NO.    : 14/100681
DATED              : October 11, 2016
INVENTOR(S)        : Junjie Guo et al.

It is certified that error appears in the above-identified patent and that said Letters Patent is hereby corrected as shown below:

In the Claims
Claim 1, Column 7, Line 12, please delete "index".
Claim 12, Column 8, Line 31, please delete "index".

Signed and Sealed this
Sixth Day of December, 2016

Michelle K. Lee
*Director of the United States Patent and Trademark Office*